United States Patent
Bolger et al.

(10) Patent No.: US 8,312,223 B2
(45) Date of Patent: Nov. 13, 2012

(54) PRE-FETCHING VIRTUAL ENVIRONMENT IN A VIRTUAL UNIVERSE BASED ON PREVIOUS TRAVERSALS

(75) Inventors: Rosa M. Bolger, Austin, TX (US); Ann Corrao, Raleigh, NC (US); Rick A. Hamilton, II, Charlottesville, VA (US); Brian M. O'Connell, Cary, NC (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/342,543

(22) Filed: Dec. 23, 2008

(65) Prior Publication Data

US 2010/0161906 A1    Jun. 24, 2010

(51) Int. Cl.
*G06F 12/02*    (2006.01)
(52) U.S. Cl. ............... 711/137; 711/E12.002; 715/757; 345/419
(58) Field of Classification Search .................. 711/137, 711/E12.002; 715/757; 345/419
See application file for complete search history.

(56) References Cited

U.S. PATENT DOCUMENTS

| 7,073,129 | B1 | 7/2006 | Robarts et al. |
| 7,373,377 | B2 | 5/2008 | Altieri |
| 2008/0098064 | A1* | 4/2008 | Sherinian ............ 709/203 |

OTHER PUBLICATIONS

Marvie, J-E et al., "A VrmL97-X3D Extension for Massive Scenery Management in Virtual Worlds," IEEE/ACM Digital Library 2004, pp. 145-153, 188.
Hadjiefthymiades, S. et al., "Using Proxy Cache Relocation to Accelerate Web Browsing in Wireless/Mobile Communications," ACM Digital Library, WWW10, May 1-5, 2001, Hong Kong, pp. 26-34.
He, Z. et al., "Path and cache conscious prefetching (PCCP)," ACM Digital Library, the VLDB Journal (2007), pp. 235-249.

* cited by examiner

*Primary Examiner* — Yong Choe
(74) *Attorney, Agent, or Firm* — William E. Schiesser; Ronald A. D'Alessandro; Keohane & D'Alessandro PLLC

(57) ABSTRACT

An approach is provided for pre-fetching of virtual content in a virtual universe based on previous traversals. In one embodiment, there is a pre-fetching tool, including a ranking component configured to rank each of a plurality of parcels of locations previously visited by an avatar according to pre-defined ranking criteria. The pre-fetching tool further includes a pre-fetching component configured to pre-fetch a virtual content of said parcels of locations based on the ranking.

27 Claims, 8 Drawing Sheets

US 8,312,223 B2

PRE-FETCHING VIRTUAL ENVIRONMENT IN A VIRTUAL UNIVERSE BASED ON PREVIOUS TRAVERSALS

FIELD OF THE INVENTION

This invention relates generally to virtual universes and more specifically to pre-fetching of virtual content in a virtual universe based on previous traversals.

BACKGROUND OF THE INVENTION

Virtual universes or virtual worlds are computer-based simulated environments intended for its users or residents to inhabit and interact via avatars, which are personas or representations of the users of the virtual universes. These types of virtual universes are now most common in massively multi-player online games such as Second Life®, which is a trademark of Linden Research Inc. in the United States. Avatars in these types of virtual universes, which can number well over a million, have a wide range of business and social experiences.

Many regions within a virtual universe contain complex environments with a large number of objects. Prior art virtual universes only cache items attached to or worn by an avatar, or items located within a predefined proximity of the avatar. As is known in the art, avatars may teleport to new regions within the virtual universe. Often avatar's traversal patterns and teleportation patterns are conditioned by the date and time of user's login to the virtual universe. Since the new regions to which an avatar transports are not within the predefined proximity, often such avatar that travels to a new location must wait while objects in the new location are downloaded and rendered. This may not provide an optimal experience, as most users do not like to wait for downloading and rendering.

SUMMARY OF THE INVENTION

The current invention solves a particular problem of providing a method and system for caching and pre-fetching objects based on the user's previous virtual universe traversals. It further provides a method for predicting a pattern for travelling by an avatar using data relating to avatar's travel history, analyzing such data and applying the result of such analysis when new teleport offers are received. This allows for caching and pre-fetching of objects from parcels most likely to be visited by the avatar and therefore it enhances the user's experience by reducing wait times for rendering of the objects.

In one embodiment, there is a method for pre-fetching a virtual content in a virtual universe, the method comprising: ranking each of a plurality of parcels of locations previously visited by an avatar according to predefined ranking criteria; and pre-fetching a virtual content of the parcels of locations based on such ranking.

In a second embodiment, there is a computer system for pre-fetching a virtual content in a virtual universe, comprising: at least one processing unit; memory operably associated with the at least one processing unit; and a pre-fetching tool storable in memory and executable by the at least one processing unit, the pre-fetching tool comprising: a ranking component configured to rank each of a plurality of parcels of locations previously visited by an avatar according to pre-defined ranking criteria; and a pre-fetching tool configured to pre-fetch a virtual content of the parcels of locations based on such ranking.

In a third embodiment, there is a computer-readable medium storing computer instructions, which when executed, enables a computer system to provide pre-fetching of a virtual content in a virtual universe, the computer instructions comprising: ranking each of a plurality of parcels of locations previously visited by an avatar according to pre-defined ranking criteria; and pre-fetching a virtual content of the parcels of locations based on such ranking.

In a fourth embodiment, there is a method for deploying a pre-fetching tool for use in a computer system that provides pre-fetching of a virtual content in a virtual universe, the method comprising: providing a computer infrastructure operable to: rank each of a plurality of parcels of locations previously visited by an avatar according to predefined ranking criteria; and pre-fetch a virtual content of the parcels of locations based on such ranking.

Figure 1:
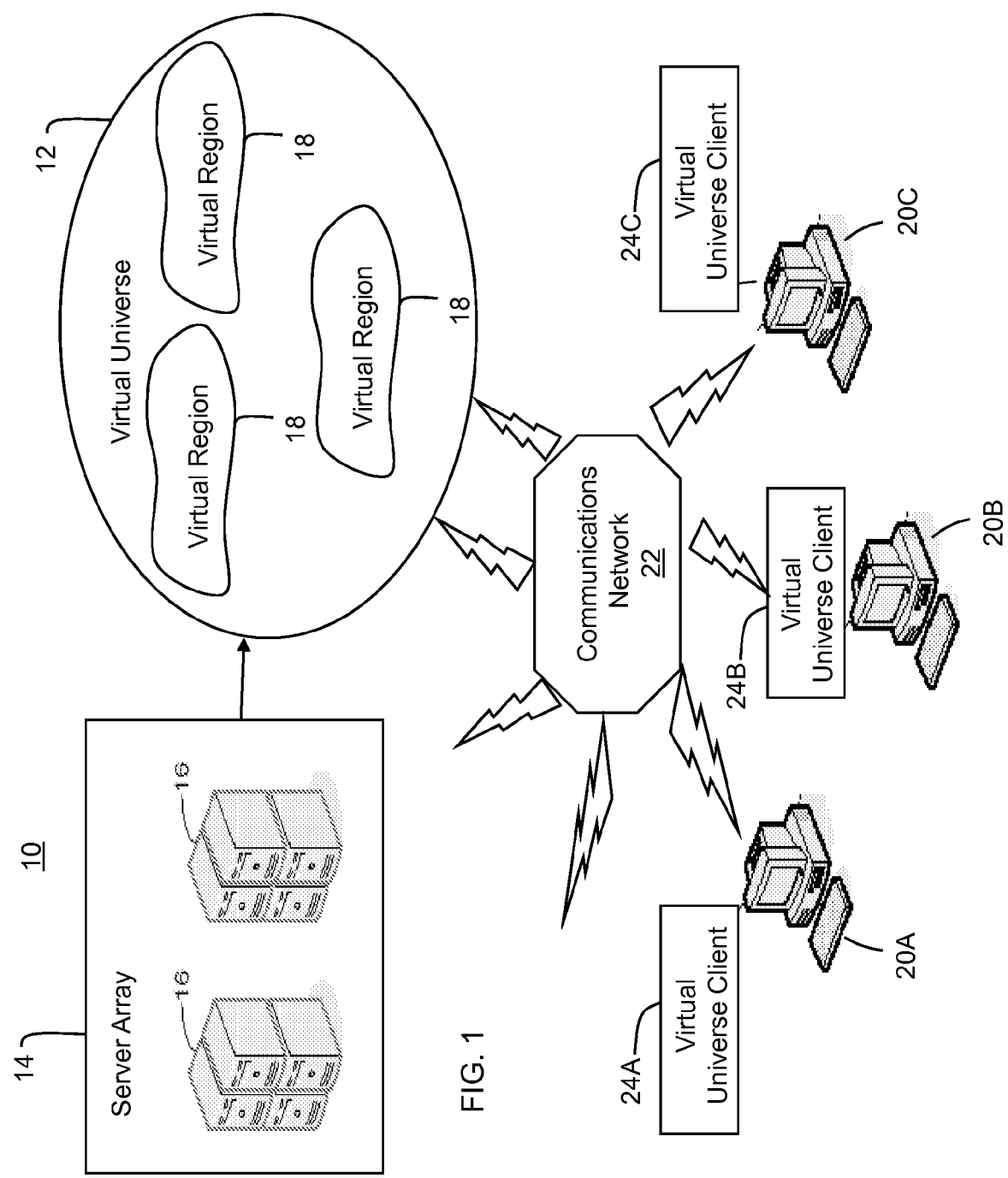
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to pre-fetching virtual content in a virtual universe, such that wait times for the rendering of virtual content are reduced. In these embodiments, a pre-fetching tool provides the capability to pre-fetch virtual content in the virtual universe based on previous traversals. Specifically, the pre-fetching tool pre-fetches the virtual content of a parcel identified based on matching current day of the week and time to a day of the week and time of previous visits and selecting such parcels based on such matching where the avatar stayed the longest. As used herein, pre-fetching is defined as the downloading and caching of virtual content (i.e., objects, textures and scripts) to a cache prior to the rendering of the virtual content.

FIG. 1 shows a high-level schematic diagram showing a networking environment 10 for providing a virtual universe 12 according to one embodiment of this invention in which a service for pre-fetching virtual content can be utilized. As shown in FIG. 1, networking environment 10 comprises a server array or grid 14 comprising a plurality of servers 16, each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures and scripts. Like the real-world, each virtual region 18 within virtual universe 12 comprises a landscape having virtual content, such as buildings, stores, clubs, sporting arenas, parks, beaches, cities and towns all created by residents of the universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with virtual universe 12 through a communication network 22 via virtual universe clients 24A-24C (hereinafter referred generally as 24) that reside in computers 20, respectively. Below are further details of virtual universe 12, server array 14, and virtual universe client 24.

Figure 2:
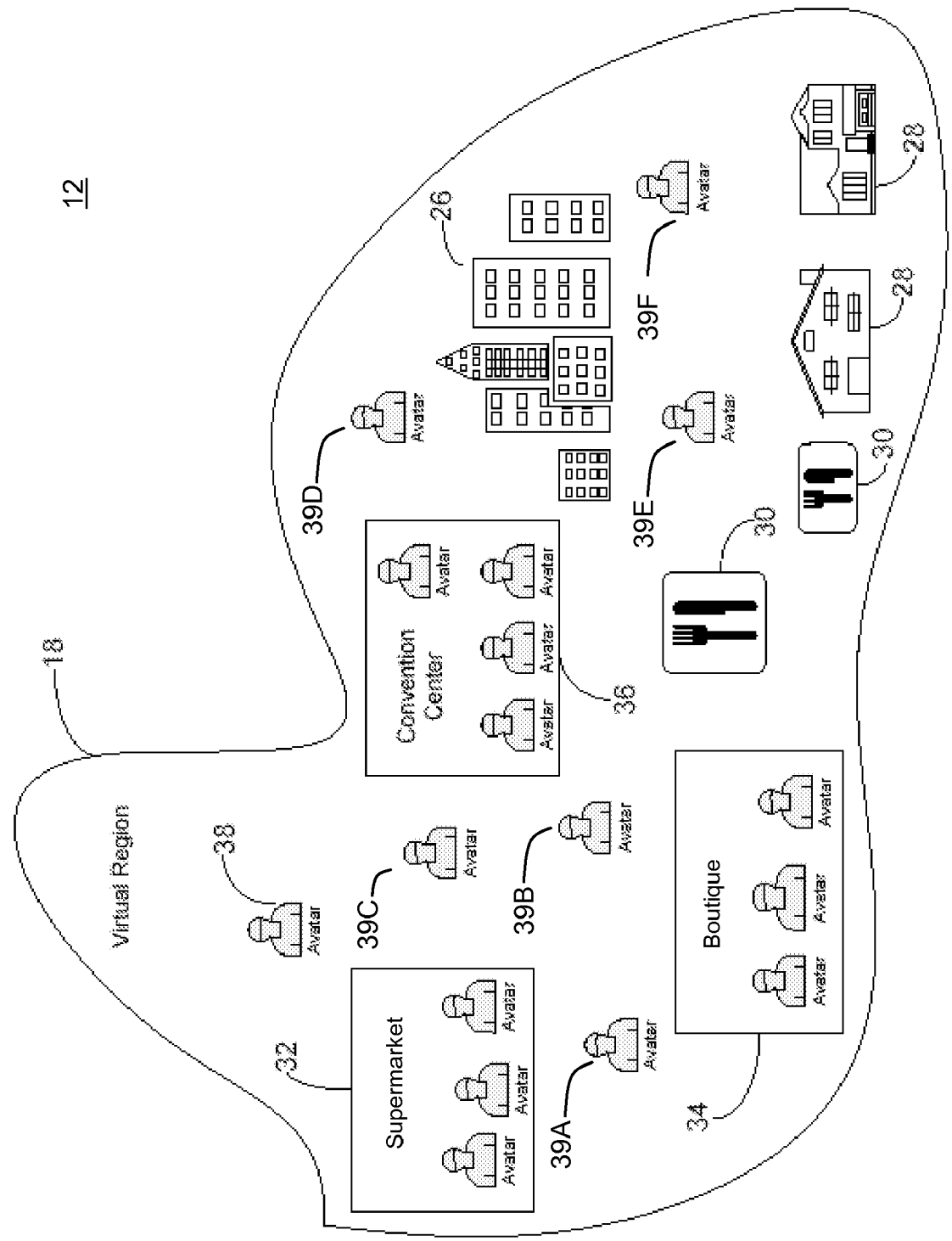
FIG. 2 shows a more detailed view of a virtual region shown in the virtual universe of FIG. 1.

FIG. 2 shows a more detailed view of an exemplary virtual region found in virtual universe 12. As an example, virtual region 18 shown in FIG. 2 comprises virtual content, including: a downtown office center 26, homes 28, restaurants 30, a supermarket 32 and a boutique 34 for shopping, and a convention center 36 for meetings and various conventions. An avatar 38, which as mentioned above, is a persona or representation of a user of the virtual universe, roams all about the virtual region by walking, driving, flying or even by teleportation or transportation, which is essentially moving through the virtual universe from one point to another, more or less instantaneously.

Figure 3:
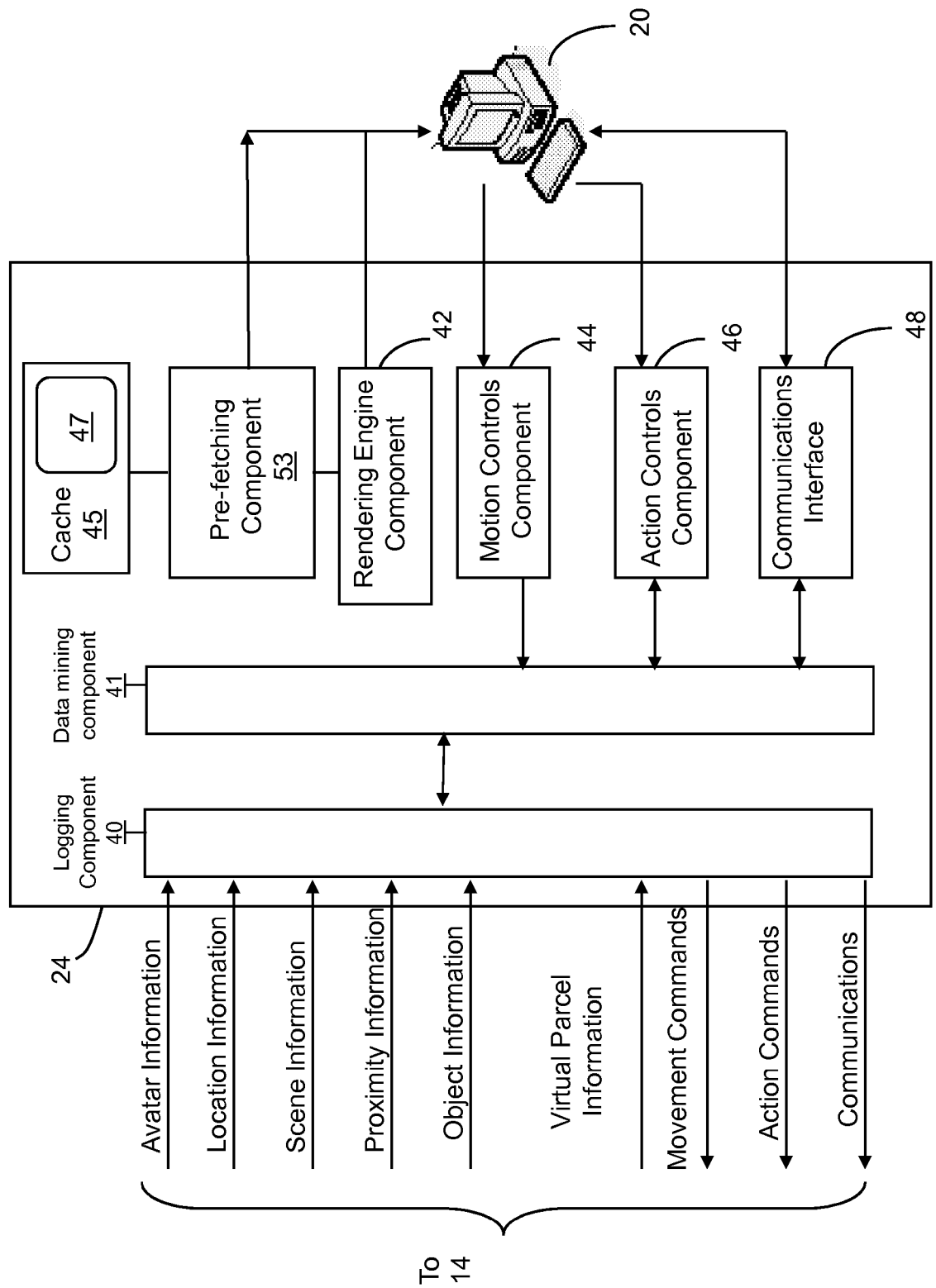
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a logging component 40, which logs date, arrival time, parcel name, parcel type, parcel telehub coordinates and departure time of avatars' visits to parcels as made by a user through computer 20, as well as information received from virtual universe 12 through server array 14. A data mining component 41 that performs analysis of data collected by data logging component 40 to determine avatar's patterns of travel. A rendering engine component 42 enables the user of computer 20 to visualize his or her avatar within the surroundings of the particular region of virtual universe 12 that the avatar is presently located.

A motion controls component 44 enables the user to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking and electronic mail (e-mail).

A pre-fetching tool 53 pre-fetches virtual content within the virtual universe, as will be further described below. As shown in FIG. 3, in the exemplary embodiment, pre-fetching tool 53 resides on the same computer system as virtual universe client 24. In other embodiments, pre-fetching tool 53 might reside on the same side as server array 14, or reside on separate computers in direct communication with virtual universe servers 16 and virtual universe client 24.

A cache 45 is provided for storing pre-fetched virtual content. As used herein, cache 45 is defined as a temporary storage area where frequently accessed data can be stored for rapid access. Cache 45 is a collection of data duplicating original values stored elsewhere or computed earlier, where the original data is expensive to fetch (due to slow access time), or to compute relative to the cost of reading cache 45. Once the data is stored in cache 45, future use may access the cached copy rather than downloading or re-computing the original data, resulting in a lower average access time. As will be further described below, virtual content can be pre-fetched by pre-fetching tool 53 and sent to cache 45 to reduce delays in the rendering of the virtual content.

FIG. 3 shows the various types of information received and logged by logging component 40 from the virtual universe through server array 14. In particular, logging component 40 receives location information about the area that the user's avatar is near (e.g., what region or land he or she is in), as well as scene information (e.g., what the avatar sees). Logging component 40 also logs information about date, arrival time, parcel name, parcel type, parcel telehub coordinates and departure time of avatars' visits to each parcel and information about the virtual content of each of such parcels.

Figure 4:
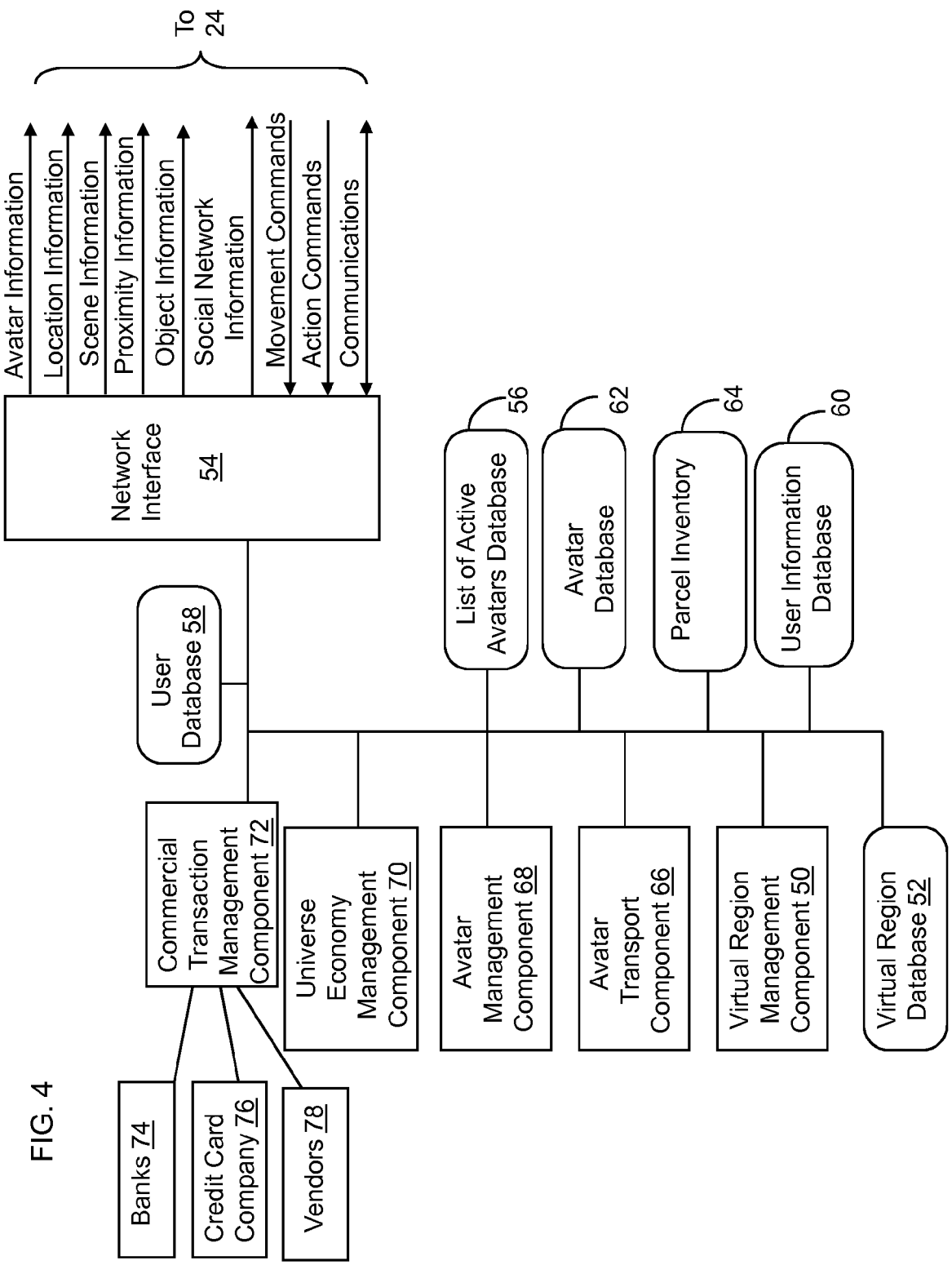
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates avatar, location, parcel name and coordinates, time, scene, proximity, script and object to the user through virtual universe client 24. The network interface receives movement and action commands, as well as communications from the user via virtual universe client 24.

As shown in FIG. 4, there are several different databases for storing information. In particular, a virtual region database 52 stores information on all of the specifics in virtual region 18 that virtual region management component 50 is managing. Specifically, virtual region database 52 contains metadata information about the objects, texts and scripts associated with the virtual content in the virtual region and in a particular parcel. In one embodiment, for very large virtual universes, one server 16 may be responsible for managing one particular virtual region 18 within the universe. In other embodiments, it is possible that one server 16 may be responsible for handling one particular land within virtual region 18.

Database 56 contains a list of all the avatars that are online in the virtual universe 12, while databases 58 and 60 contain information on the actual human users of virtual universe 12. In one embodiment, database 58 contains general information on the users such as names, addresses, interests, ages, etc., while database 60 contains more sensitive information on the users such as email addresses, and billing information (e.g., credit card information) for taking part in transactions. Databases 62 and 64 contain information on the avatars of the users that reside in virtual universe 12. In one embodiment, avatar database 62 contains information such as all of the avatars that a user may have, the profile of each avatar, and avatar characteristics (e.g., appearance, voice and movement features).

Those skilled in the art will recognize that databases 58-64 may contain additional information if desired. Databases 58-64 may be consolidated into a single database or table, divided into multiple database or tables, or clustered into a database system spanning multiple physical and logical devices. Further, although the above information is shown in FIG. 4 as being stored in databases, those skilled in the art will recognize that other means of storing information can be utilized. For example, parcel inventory 64 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which as mentioned above, allows avatars to travel through space from one point to another point, more or less instantaneously. Moving from one virtual region to a second virtual region requires the virtual content in the second region to be rendered as quickly as possible. Pre-fetching tool 53 of the present invention reduces wait times for the rendering of virtual content by pre-fetching the virtual content from the various locations avatar 38 is likely to visit.

An avatar management component 68 keeps track of what the avatars are doing while in the virtual universe. For example, avatar management component 68 can track where each avatar presently is in the virtual universe, as well as what activities it is performing or has recently performed. It can further communicate such data to logging component 40 (FIG. 3) to be then further analyzed by data mining component 41 (FIG. 3). An illustrative but non-exhaustive list of activities can include shopping, eating, talking, recreating, etc.

Since a typical virtual universe has a vibrant economy, server array 14 (FIG. 1) has functionalities that are configured to manage the economy. In particular, a universe economy management component 70 manages transactions that occur within the virtual universe between avatars. In one embodiment, virtual universe 12 will have its own currency that users pay for with real-world money. The users can then take part in commercial transactions for their avatars through universe economy management component 70. For example, an avatar might want to pay for a service that provides this pre-fetching capability. In this case, the avatar would purchase this service using the virtual universe currency. In some instances, the user may want to take part in a commercial transaction that benefits the user and not an avatar. For example, while walking around a commercial zone, a user may see a pair of shoes that he or she would like for themselves and not their avatar. A commercial transaction management component 72 allows the user to participate in the transaction. In order to fulfill this type of transaction and others similarly related, commercial transaction management component 72 interacts with banks 74, credit card companies 76 and vendors 78.

As mentioned earlier, pre-fetching tool 53 (FIGS. 2 and 5) provides the capability to pre-fetch virtual content in virtual universe 12 based on previous traversals of avatar 38. As it is possible that a plurality of travel paths of avatar 38 may contain a large number of parcels, it is generally undesirable to download the virtual content of every such parcel. Therefore, pre-fetching tool 53 comprises a ranking component 80 configured to rank each parcel and thereby to determine which parcels are more likely be visited by the avatar 38 according to predefined ranking criteria.

In one embodiment data analysis is performed to determine patterns of travel. In such embodiment, the ranking component 80 includes a location ranking tool 83 for determining the rank of each of locations visited by an avatar. Referring to the ranking metric 83 below, which is described in the context of Table 1, one possible method of implementing the described ranking method is shown. In this example, the day of the week, time of the day and length of time spent in location predominately determine the rank of each parcel.

The method proposed in this embodiment, ranks the locations that a user commonly travels to. The higher ranked locations are more likely to be visited than the lower ranked destinations. The ranking algorithm used by the location ranking tool 83 computes such ranks based on the day of the week, time of the day, and length of time spent in a given location. The described computation determines the likelihood of a user returning to that location in the near future. In one embodiment such data mining is invoked upon user's initial logon. In another embodiment the invocation of such data mining is custom configured by a user. Table 1 below contains an example output from the data mining component.

TABLE 1

| Day of week | Hour | Location Name | Location Type | Coordinate | Total Minutes | Total Visits |
|---|---|---|---|---|---|---|
| Monday | 09 | Coffee Shop | Coffee Shop | 149,23,79 | 82 | 14 |
| Monday | 09 | Train Station | Transportation | 221,87,22 | 24 | 23 |
| Monday | 10 | Sales Center | Business | 21,232,28 | 300 | 5 |
| Monday | 10 | Research Center | Business | 127,128,36 | 110 | 3 |
| ... | ... | ... | ... | ... | ... | ... |
| Friday | 23 | Avatar's home | Residential | 56,48,147 | 60 | 5 |
| Saturday | 09 | Avatar's home | Residential | 56,48,147 | 60 | 5 |
| Saturday | 10 | Avatar's home | Residential | 56,48,147 | 60 | 5 |
| Saturday | 11 | Water-ski park | Water sports park | 47,90,221 | 40 | 1 |
| Saturday | 11 | Baseball Stadium | Baseball Park | 67,456,89 | 120 | 2 |

As shown in Table 1, the output table contains at most two entries for every given day of the week and hour combination. Further, there are 7 days of the week and 24 hours per day and a maximum of two records per combination, producing the maximum number of records in the output table to be 336. Limiting the table in such a way expedites the process of identifying the most probable parcel of location within the virtual universe to be visited next.

Further, the output of the data mining component 41 (FIG. 3) is examined to locate the virtual universe parcel with the most total minutes for the current day of the week and hour combination. In one embodiment this method is invoked at configurable intervals such as every hour, or triggered by user interaction or user's specific actions, for example, user returning from a prolonged idle state. In this specific example, all textures, objects and scripts are pre-fetched at the parcel that is the predetermined arrival place. In case the avatar is already in the highest ranked location, then the second highest ranked location is pre-fetched.

Figure 7:
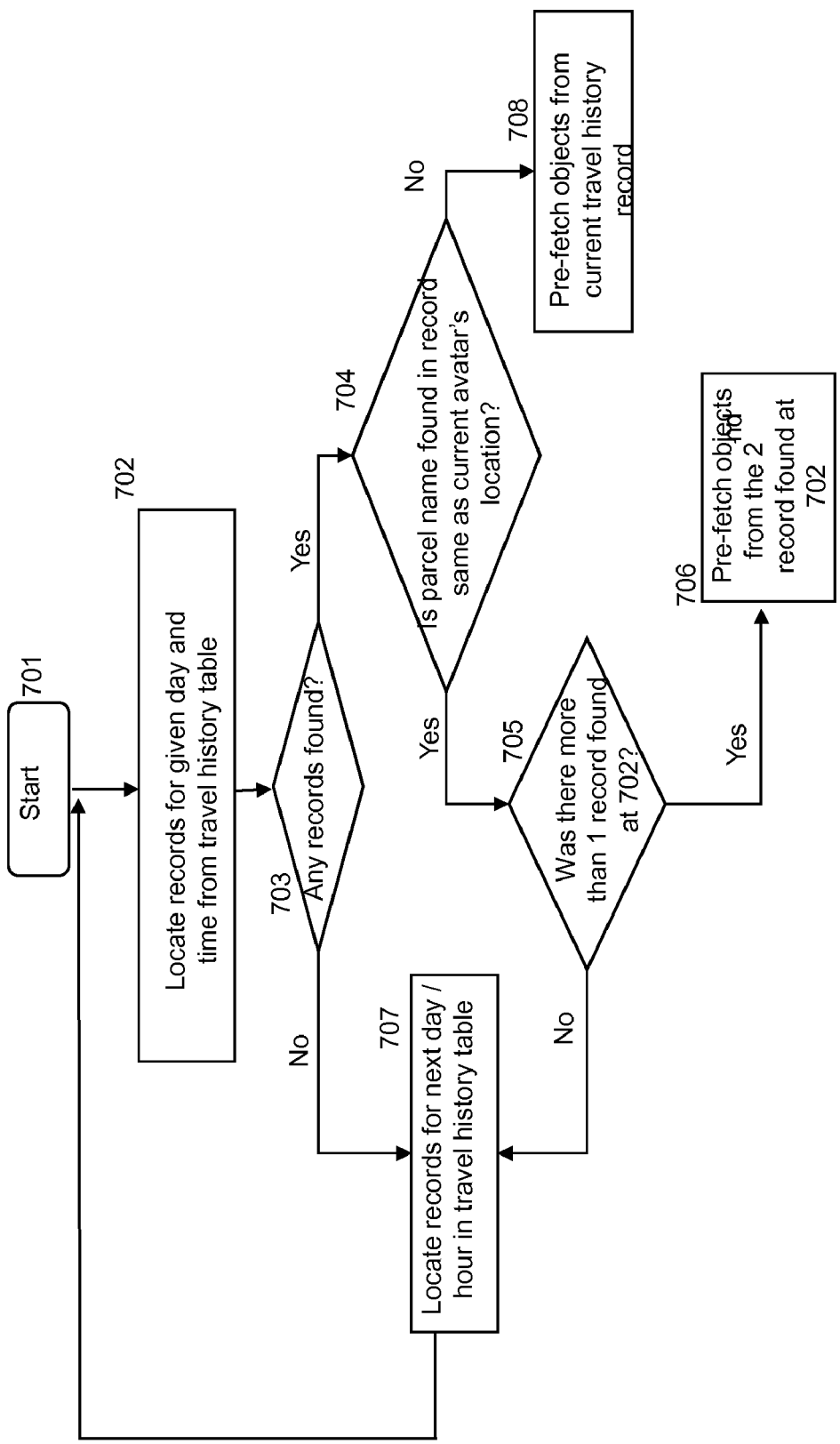
FIG. 7 shows a flow chart of a method for pre-fetching virtual content in the virtual universe according to one embodiment of the invention.

FIG. 7 shows a flow chart of a method for pre-fetching of virtual environment according to the embodiment described above in [0037]. As such at step 702, records for given day and time are located from travel history table. Parcel name found in the record is compared to the parcel name of the current location of the avatar at step 704. If the parcel name is the same, then step 705 checks to see whether multiple records were found at step 702, and if there were multiple records found, at step 706 objects from the second record found are pre-fetched. If, however, at 704 it is determined that parcel name found in record is not the same as the name of current avatar's location then at 708 objects from current travel history record are pre-fetched.

Figure 8:
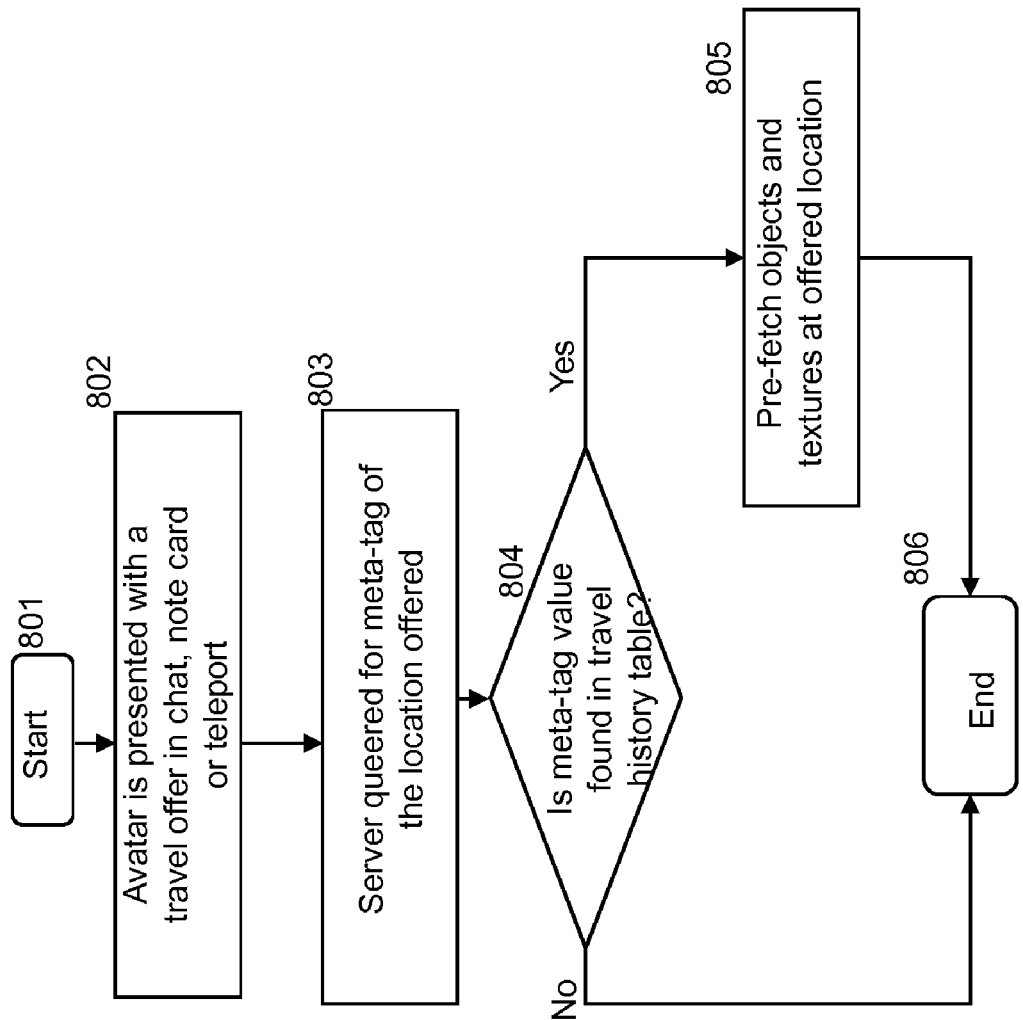
FIG. 8 depicts a flow chart of a specific example of a method for pre-fetching virtual content in the virtual universe when avatar is presented with travel offer.

In another embodiment, the virtual content of a parcel is pre-fetched upon avatar's receiving a travel offer. Such travel offers are presented using a plurality of mediums, such as: chat conversations, a link included in a note card, a teleport offer or a teleporter located close to avatar. The travel offer invokes a process in which the parcel-type or metadata of the destination location is compared against the metadata of previously visited locations. FIG. 8 depicts a method flow chart for such an embodiment. More specifically, at step 802 the avatar is presented with such travel offer. At step 803 server is queered for meta-tag of the location offered. At step 804 it is determined whether such meta-tag value is found in the travel history table. If it is found, then objects and textures from such offered location is pre-fetched at step 805.

Referring again to FIG. 5, pre-fetching tool 53 further comprises a pre-fetching component 82 configured to pre-fetch the virtual content of a parcel of location most likely to be visited by an avatar next as determined based on the ranking by ranking component 80. Pre-fetching component 82 downloads and caches the objects, textures and scripts that are most likely to be surrounding avatar 38 at the location of next traversal. By assigning a ranking to each parcel to be visited by avatar 38, the parcels that are more likely to be visited can be determined. The virtual content at the remote location of the higher ranked parcels can be pre-fetched by pre-fetching component 82 and delivered to cache 45 (as shown in FIG. 3) for future rendering. Pre-fetching component 82 permits the virtual universe to cache objects most likely to be surrounding avatar 38 in the future based on avatar's traversals that have occurred in the past.

Figure 5:
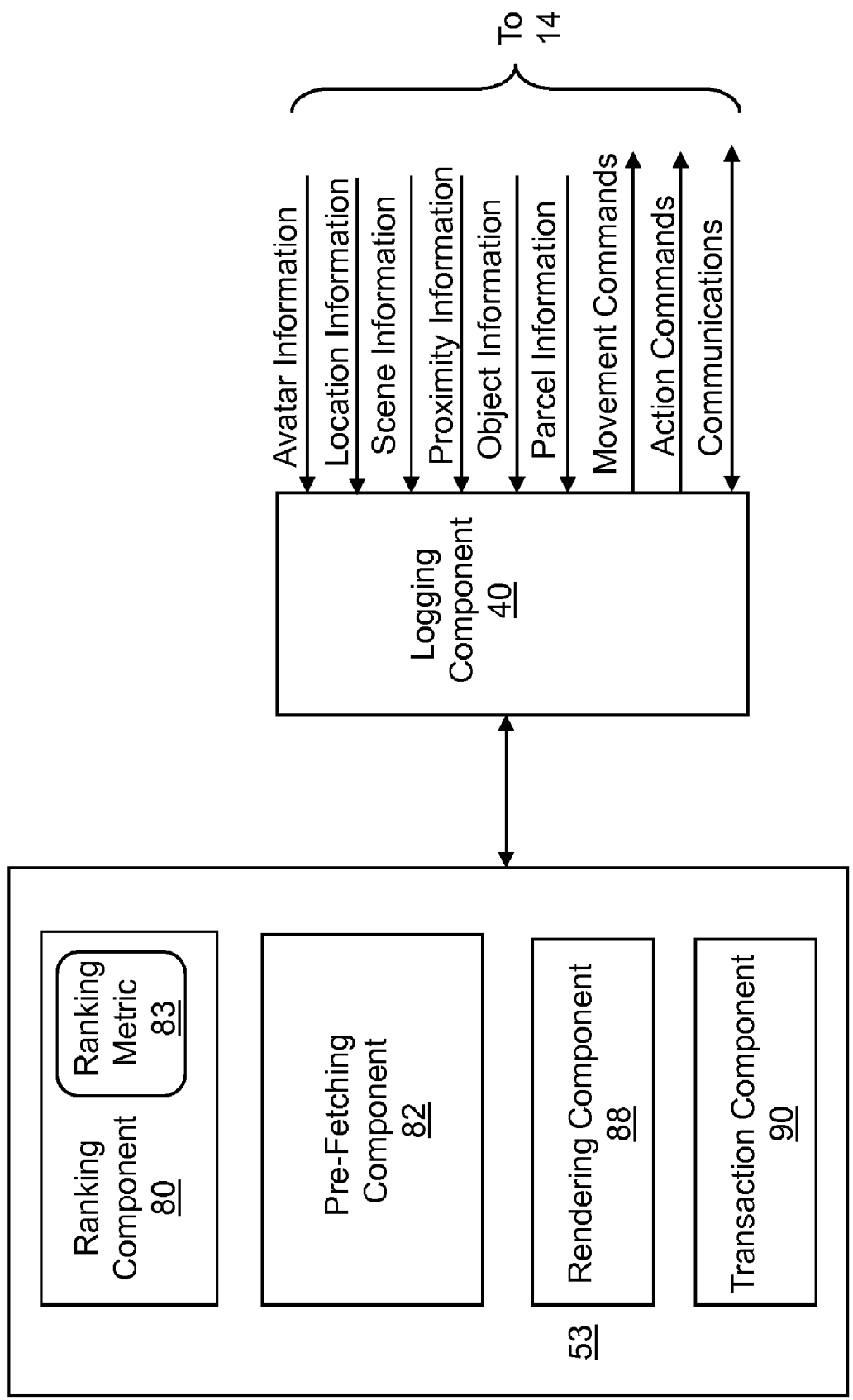
FIG. 5 shows a pre-fetching tool according to one embodiment of this invention that operates in the environment shown in FIG. 1.

As further shown in FIG. 5, pre-fetching tool 53 comprises a rendering component 88 configured to render the pre-fetched virtual content of the parcel most likely to be visited by avatar 38. As used herein, rendering is the process of producing the pixels of an image from a higher-level description of its components. Additionally, rendering is the process of generating an image from a model, by means of computer programs. The model is a description of three-dimensional objects in a strictly defined language or data structure. Models contain geometry, viewpoint, texture, lighting, and shading information.

In another embodiment of this invention, pre-fetching tool 53 is used as a service to charge fees for each pre-fetch or download invoked. As shown in FIG. 5, pre-fetching tool 53 comprises a transaction component 90 configured to charge a pre-fetching fee for pre-fetching the virtual content. In this embodiment, the provider of the virtual universe or a third party service provider could offer this pre-fetching as a service by performing the functionalities described herein on a subscription and/or fee basis. In this case, the provider of the virtual universe or the third party service provider can create, deploy, maintain, support, etc., pre-fetching tool 53 that performs the processes described in the invention. In return, the virtual universe or the third party service provider can receive payment from the virtual universe residents via universe economy management component 70 and commercial transaction management component 72.

In still another embodiment, the methodologies disclosed herein can be used within a computer system to provide pre-fetching of the virtual content in the virtual universe. In this case, pre-fetching tool 53 can be provided, and one or more system for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
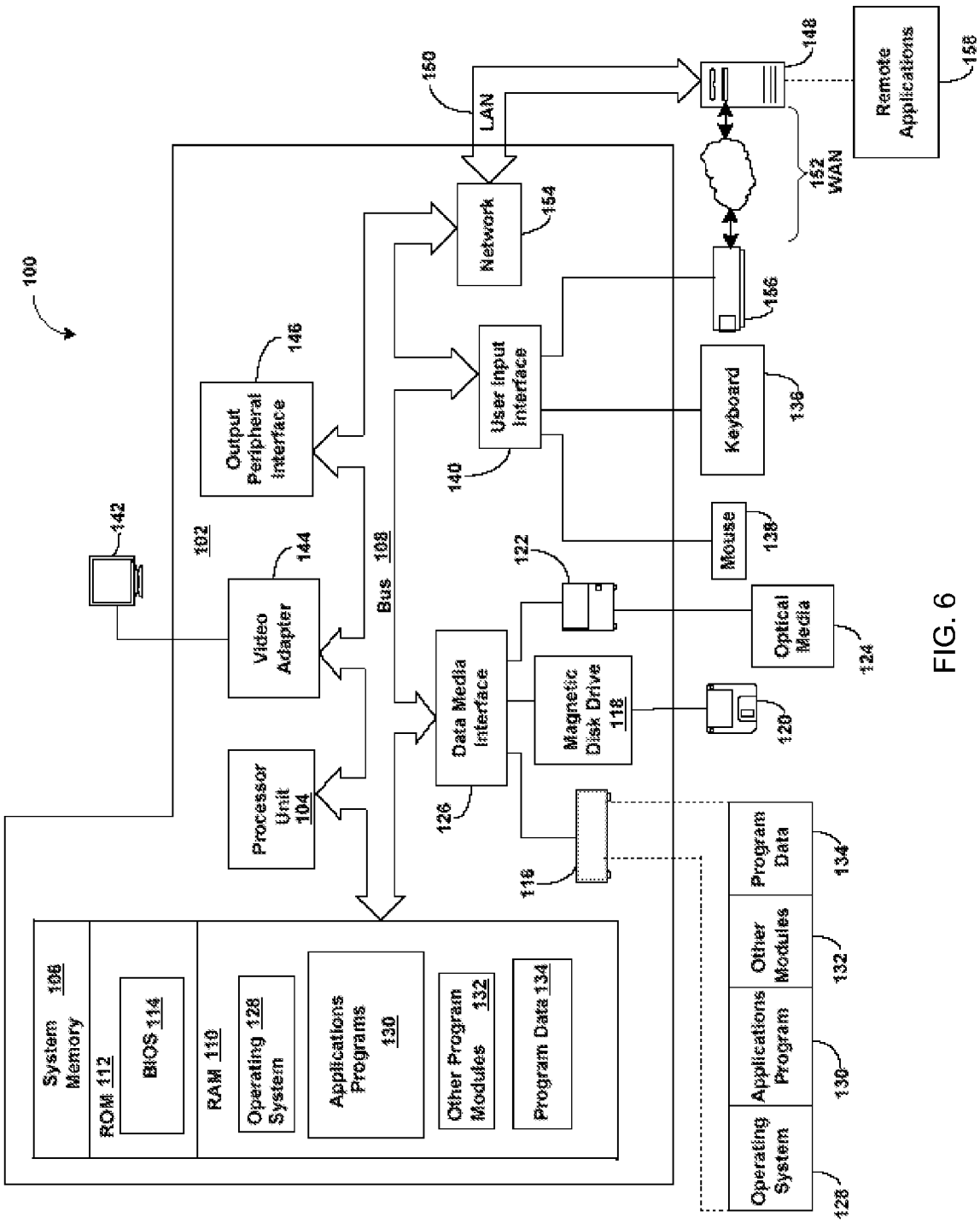
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 6.

In the computing environment 100 there is a computer 102, which is operational with numerous other general purpose or special purpose computing system environments or configurations. Examples of well known computing systems, environments, and/or configurations that may be suitable for use with exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 6, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of operating system 128, one or more application programs 130 other program modules 132, and program data 134 or some combination thereof, may include an implementation of the networking environment 10 of FIG. 1 including server array 14, virtual universe client 24 and pre-fetching tool 53. In one embodiment, the one or more application programs 130 include components of pre-fetching tool 53 such as ranking component 80, pre-fetching component 82 and rendering component 88.

The one or more program modules 130 carry out the methodologies disclosed herein, as shown in FIG. 7. According to one embodiment, in step S1, past traversals of an avatar are analyzed. In S2, each of the plurality of parcels previously visited by the avatar are ranked according to predetermined ranking criteria. In S5, the virtual content of such parcels is pre-fetched. In S4, the pre-fetched virtual content is rendered.

The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 6, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, computer 102 is connected to LAN 150 via network interface or adapter 154. When used in a WAN networking environment, the computer typically includes a modem 156 or other means for establishing communications over WAN 152. The modem, which may be internal or external, may be connected to system bus 108 via user input interface 140 or other appropriate mechanism.

In a networked environment, program modules depicted relative to computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

In another embodiment, there is provided a business method that performs the process of the invention on a subscription, advertising, and/or fee basis. That is, a service provider, such as a Solution Integrator, could offer to provide the functionality described herein. In this embodiment, the service provider can create, maintain, support, etc., a computer infrastructure, similar to computer 102 that performs the process of the invention for one or more customers. In return, the service provider can receive payment from the customers under a subscription and/or fee agreement and/or the service provider can receive payment from the sale of advertising content to one or more third parties.

In still another embodiment, a computer-implemented method for performing the functionality described herein is provided. In this case, a computer infrastructure, such as computer infrastructure 102, can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 102, from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

In yet another embodiment, a data processing system suitable for storing and/or executing program code is provided hereunder that includes at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

What is claimed is:

1. A method for pre-fetching a virtual content in a virtual universe, said method comprising:

ranking each of a plurality of parcels of locations previously visited by an avatar according to predefined ranking criteria;

analyzing the results of said ranking to determine said avatar's travel history;

predicting a pattern of travel by said avatar, said predicting based on said avatar's travel history; and
pre-fetching a virtual content of said parcels of locations based on said predicting.

2. The method according to claim 1 further comprising rendering the virtual content of each of the plurality of said parcels of locations.

3. The method according to claim 1 further comprising analyzing a set of parcels of locations from past traversals of said avatar to determine a set of parcels of locations from the plurality of parcels of locations previously visited by said avatar that are more likely to be visited upon next traversal.

4. The method according to claim 3, the next traversal comprising a teleport action.

5. The method according to claim 3, said analyzing comprising:
    recording date, arrival time, parcel name, parcel type, parcel coordinates and departure time of each avatar's visit for each parcel of locations visited by the avatar;
    calculating a length of time spent by said avatar at each said parcel;
    matching current day of the week and time to a day of the week and time of previous visits, and
    selecting no more than two parcels of locations based on said matching where said avatar stayed the longest during previous visits.

6. The method according to claim 5, said matching performed every hour.

7. The method according to claim 5, said matching triggered by users' interactions.

8. A computer system for pre-fetching a virtual content in a virtual universe, comprising:
    at least one processing unit;
    memory operably associated with the at least one processing unit; and
    a pre-fetching tool storable in memory and executable by the at least one processing unit, the pre-fetching tool comprising:
    a ranking component configured to rank each of a plurality of parcels of locations previously visited by an avatar according to predefined ranking criteria;
    an analyzing component configured to analyze results of said ranking to determine said avatar's travel history;
    a predicting component configured to predict a pattern of travel by said avatar, said predicting based on said avatar's travel history; and
    a pre-fetching tool configured to pre-fetch a virtual content of said parcels of locations based on said predicting.

9. The pre-fetching tool according to claim 8 further comprising a rendering component configured to render the virtual content of each of the plurality of said parcels of locations.

10. The pre-fetching tool according to claim 8, said ranking component configured to analyze a set of locations from past traversals of an avatar to determine a set of parcels of locations from the plurality of parcels of locations previously visited by said avatar that are more likely to be visited upon next traversal.

11. The pre-fetching tool according to claim 10, said next traversal comprising a teleport action.

12. The ranking component according to claim 10, further comprising:
    recording component configured to record date, arrival time, parcel name, parcel type, parcel coordinates and departure time of each avatar's visit for each parcel of locations visited by said avatar;
    calculating component configured to calculate a length of time spent by said avatar at each said parcel;
    matching component configured to match current day of the week and time to a day of the week and time of previous visits, and
    selecting component configured to select no more than two parcels of locations based on said matching where said avatar stayed the longest during previous visits.

13. The ranking component according to claim 10, said matching component configured to perform said matching every hour.

14. The ranking component according to claim 10, said matching component configured to perform said matching upon users' interactions.

15. A computer-readable storage device storing computer instructions, which when executed, enables a computer system to provide pre-fetching of a virtual content in a virtual universe, the computer instructions comprising:
    ranking each of a plurality of parcels of locations previously visited by an avatar according to predefined ranking criteria;
    analyzing results of said ranking to determine said avatar's travel history;
    predicting a pattern of travel by said avatar, said predicting based on said avatar's travel history; and
    pre-fetching a virtual content of said parcels of locations based on said predicting.

16. The computer-readable storage device according to claim 15 further comprising instructions for rendering the virtual content of each of the plurality of said parcels of locations.

17. The computer-readable storage device according to claim 15 further comprising instructions for analyzing a set of parcels of locations from past traversals of said avatar to determine a set of parcels of locations from the plurality of parcels of locations previously visited by said avatar that are more likely to be visited upon next traversal.

18. The computer-readable storage device according to claim 17, the next traversal comprising a teleport action.

19. The computer-readable storage device according to claim 17, said analyzing comprising: recording date, arrival time, parcel name, parcel type, parcel coordinates and departure time of each avatar's visit for each parcel of locations visited by the avatar; calculating a length of time spent by said avatar at each said parcel; matching current day of the week and time to a day of the week and time of previous visits, and selecting no more than two parcels of locations based on said matching where said avatar stayed the longest during previous visits.

20. The computer-readable storage device according to claim 19 further comprising instructions to perform said matching every hour.

21. The computer-readable storage device according to claim 19 further comprising instructions to trigger said matching by users' interactions.

22. A method for deploying a pre-fetching tool for use in a computer system that provides pre-fetching of a virtual content in a virtual universe, said method comprising:
    ranking each of a plurality of parcels of locations previously visited by an avatar according to predefined ranking criteria;
    analyzing results of said ranking to determine said avatar's travel history;
    predicting a pattern of travel by said avatar, said predicting based on said avatar's travel history; and
    pre-fetching a virtual content of said parcels of locations based on said predicting.

23. The method according to claim 22 further operable to render the virtual content of each of the plurality of said parcels of locations.

24. The method according to claim 22 further operable to analyze a set of parcels of locations from past traversals of said avatar to determine a set of parcels of locations from the plurality of parcels of locations previously visited by said avatar that are more likely to be visited upon next traversal.

25. The method according to claim 24, said analyzing comprising: recording date, arrival time, parcel name, parcel type, parcel coordinates and departure time of each avatar's visit for each parcel of locations visited by the avatar; calculating a length of time spent by said avatar at each said parcel; matching current day of the week and time to a day of the week and time of previous visits, and selecting no more than two parcels of locations based on said matching where said avatar stayed the longest during previous visits.

26. The method according to claim 25, said matching performed every hour.

27. The method according to claim 22, said next traversal comprising a teleport action.

* * * * *